(12) United States Patent
Sarin

(10) Patent No.: US 12,107,947 B2
(45) Date of Patent: *Oct. 1, 2024

(54) MULTI-BLOCKCHAIN DIGITAL TRANSACTION INFORMATION SEGREGATION SYSTEM

(71) Applicant: PAYPAL, INC., San Jose, CA (US)

(72) Inventor: Pankaj Sarin, Fremont, CA (US)

(73) Assignee: PAYPAL, INC., San Jose, CA (US)

( * ) Notice: Subject to any disclaimer, the term of this patent is extended or adjusted under 35 U.S.C. 154(b) by 374 days.

This patent is subject to a terminal disclaimer.

(21) Appl. No.: 17/327,097

(22) Filed: May 21, 2021

(65) Prior Publication Data

US 2021/0351915 A1 Nov. 11, 2021

Related U.S. Application Data

(63) Continuation of application No. 16/110,771, filed on Aug. 23, 2018, now Pat. No. 11,018,851.

(51) Int. Cl.
*H04L 9/06* (2006.01)
*G06F 9/46* (2006.01)
(Continued)

(52) U.S. Cl.
CPC ............ *H04L 9/0637* (2013.01); *G06F 9/466* (2013.01); *G06F 16/2465* (2019.01);
(Continued)

(58) Field of Classification Search
CPC ....... H04L 9/0637; H04L 9/3213; H04L 9/50; H04L 9/3239; H04L 63/12; G06F 9/466;
(Continued)

(56) References Cited

U.S. PATENT DOCUMENTS

| 2015/0302401 A1 | 10/2015 | Metral |
| 2016/0203448 A1 | 7/2016 | Metnick et al. |

(Continued)

FOREIGN PATENT DOCUMENTS

| CN | 106503992 | 3/2017 |
| CN | 107924389 | 4/2018 |
| CN | 108197944 | 6/2018 |

OTHER PUBLICATIONS

Xu, Xiwei et al. "A Taxonomy of Blockchain-Based Systems for Architecture Design," 2017 IEEE International Conference on Software Architecture (ICSA), IEEE, Apr. 3, 2017, pp. 243-252.

(Continued)

*Primary Examiner* — Cheng-Feng Huang
(74) *Attorney, Agent, or Firm* — Haynes and Boone, LLP

(57) ABSTRACT

The systems and methods of the multi-blockchain transaction information segregation system of the present disclosure receive a first digital transaction, which includes first digital transaction information and second digital transaction information, through a network via broadcast by a first transaction device. A primary blockchain address provided on a primary blockchain is then identified in the first digital transaction, and a primary blockchain smart contract that is stored on the primary blockchain in association with the primary blockchain address is accessed. The primary blockchain smart contract is then executed to cause the first digital transaction information to be stored on the primary blockchain, and the second digital transaction information to be stored on a secondary blockchain that is separate from the primary blockchain. In a specific example, the first digital transaction information identifies a physical property, and the second digital transaction information identifies a purchase price of the physical property.

20 Claims, 11 Drawing Sheets

(51) Int. Cl.
*G06F 16/2458* (2019.01)
*G06F 21/60* (2013.01)
*G06F 21/64* (2013.01)
*G06Q 20/06* (2012.01)
*H04L 9/00* (2022.01)
*H04L 9/32* (2006.01)
*H04L 9/40* (2022.01)

(52) U.S. Cl.
CPC ............ *G06F 21/602* (2013.01); *G06F 21/64* (2013.01); *G06Q 20/0658* (2013.01); *H04L 9/3213* (2013.01); *H04L 9/3239* (2013.01); *H04L 9/50* (2022.05); *H04L 63/12* (2013.01); *G06F 2216/03* (2013.01); *G06Q 2220/00* (2013.01)

(58) Field of Classification Search
CPC ............... G06F 16/2465; G06F 21/602; G06F 2216/03; G06F 21/64; G06Q 20/0658; G06Q 2220/00; G06Q 20/3827; G06Q 20/389; G06Q 20/065; G06Q 20/3825; G06Q 20/401
See application file for complete search history.

(56) References Cited

U.S. PATENT DOCUMENTS

| | | | |
|---|---|---|---|
| 2017/0046689 A1* | 2/2017 | Lohe | G06Q 20/065 |
| 2017/0085545 A1 | 3/2017 | Lohe et al. | |
| 2017/0132619 A1 | 5/2017 | Miller et al. | |
| 2017/0132620 A1 | 5/2017 | Miller et al. | |
| 2017/0163733 A1 | 6/2017 | Grefen et al. | |
| 2018/0117446 A1 | 5/2018 | Tran et al. | |
| 2018/0117447 A1 | 5/2018 | Tran et al. | |
| 2018/0130034 A1 | 5/2018 | Taylor et al. | |
| 2018/0191503 A1* | 7/2018 | Alwar | H04L 9/3242 |
| 2018/0218176 A1 | 8/2018 | Voorhees et al. | |
| 2018/0331835 A1 | 11/2018 | Jackson | |
| 2019/0180276 A1 | 6/2019 | Lee et al. | |
| 2019/0182257 A1 | 6/2019 | Lee et al. | |
| 2019/0188706 A1* | 6/2019 | McCurtis | H04L 9/3239 |
| 2019/0220831 A1* | 7/2019 | Rangarajan | H04L 9/3239 |
| 2019/0340267 A1 | 11/2019 | Vo et al. | |
| 2019/0340586 A1 | 11/2019 | Sheng et al. | |
| 2019/0378133 A1* | 12/2019 | Deshpande | H04L 9/3215 |
| 2020/0067697 A1* | 2/2020 | Puddu | G06Q 20/382 |

OTHER PUBLICATIONS

International Appl. No. PCT/US2019/047979, International Preliminary Report on Patentability mailed on Mar. 4, 2021, 7 pages.
International Appl. No. PCT/US2019/47979, International Search Report and Written opinion mailed Nov. 12, 2019, 12 pages.
Communication pursuant to Article 94(3) EPC for European Application No. 19851775.7 mailed on Dec. 6, 2023, 11 pages.
Extended European Search Report for Application No. 19851775.7 mailed on Sep. 24, 2021, 9 pages.
Wood G., et al., "Ethereum: a Secure Decentralised Generalised Transaction Ledger Final Draft Under Review," Jun. 4, 2014, Retrieved from the Internet: URL: http://gavwood.com/paper.pdf, on Jan. 18, 2016, 32 pages.
Zamyatin A., et al., "XCLAIM: Trustless, Interoperable, Cryptocurrency-Backed Assets," Jan. 1, 2018, Retrieved from the Internet: URL: https://eprint.iacr.org/2018/643.pdf, on Aug. 28, 2019, 18 pages.
Back, Adam et al. "Enabling blockchain innovations with pegged sidechains," 2014, 25 pages [online] Retrieved from the Internet <URL: https://block.academy/researches/sidechains.pdf>.
Dilley, Johnny et al. "Strong Federations: An Interoperable Blockchain Solution to Centralized Third-Party Risks," arXiv preprint arXiv:1612.05491, 2017, 14 pages.

* cited by examiner

MULTI-BLOCKCHAIN DIGITAL TRANSACTION INFORMATION SEGREGATION SYSTEM

CROSS-REFERENCE TO RELATED APPLICATIONS

This application is a continuation of U.S. patent application Ser. No. 16/110,771, filed on Aug. 23, 2018, issuing as U.S. Pat. No. 11,018,851, the disclosure of which is herein incorporated by reference in its entirety.

BACKGROUND

Field of the Disclosure

The present disclosure generally relates to blockchains, and more particularly to segregating digital transaction information using multiple blockchains.

Related Art

More and more consumers are participating in transactions over electronic networks such as, for example, the Internet. For example, consumers routinely purchase products and services from merchants and individuals alike. The transactions may take place directly between a conventional or on-line merchant or retailer and the consumer, and payment is typically made by entering credit card or other financial information. Such digital transactions may also take place with the aid of an on-line or mobile payment service provider such as, for example, PayPal, Inc. of San Jose, CA Payment service providers can make transactions easier and safer for the parties involved. Performing transactions with the assistance of a payment service provider from the convenience of virtually anywhere using a mobile device is one main reason why the number of on-line/mobile transactions is growing very quickly.

A growing area of digital transactions has been enabled by blockchain technology, which allows parties to participate in digital blockchain-based transactions with each other via a distributed network of computing devices that validate the digital transactions, and that may be centralized (e.g., controlled by one or more cooperating entities), or decentralized (e.g., controlled by non-cooperating entities). However, conventional blockchain systems suffer from a number of issues. For example, digital transactions performed on a conventional blockchain system result in all of the digital transaction information associated with those digital transactions being stored on that blockchain in a public manner. As such, the size of blockchains utilized in blockchain systems grows relatively quickly, with the blockchain publicizing digital transaction information that participants may wish to keep private, or including digital transaction information that is not relevant to most parties utilizing the blockchain system. Solutions to these issues include reducing the amount of digital transaction information included in digital transaction and/or stored on the blockchain. However, such solutions provide for limited digital transactions, and may prevent the storage and retrieval of information that is valuable to at least some parties utilizing the blockchain system.

Thus, there is a need for an improved blockchain system.

Figure 1:
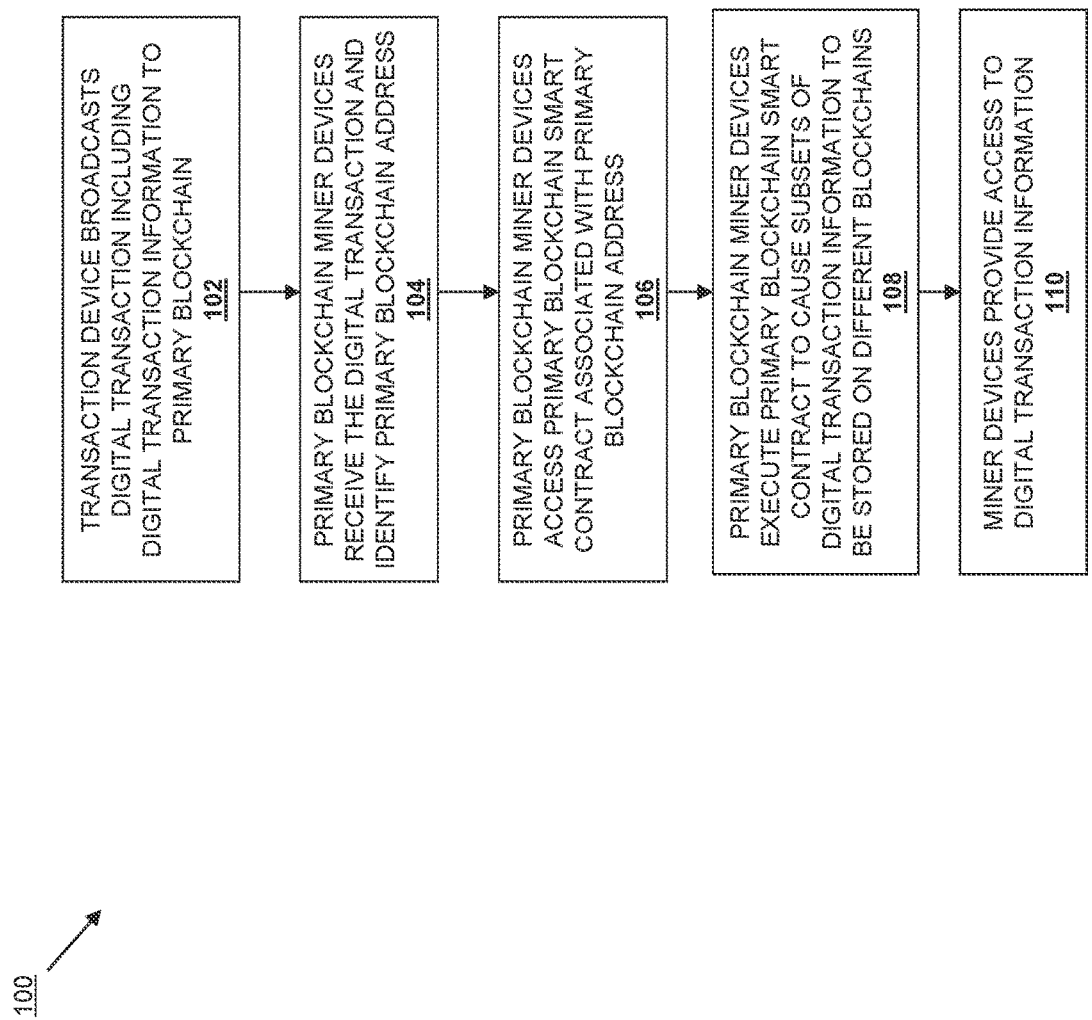
FIG. 1 is a flow chart illustrating an embodiment of a method for segregating digital transaction information using multiple blockchains.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Some embodiments of the present disclosure provide systems and methods for utilizing multiple blockchains to segregate digital transaction information included in any particular digital transaction. This may be accomplished, at least in part, by providing a primary blockchain smart contract in association with a primary blockchain address included in a primary blockchain, with that primary blockchain smart contract configured to cause different digital transaction information included in digital transactions directed to that primary blockchain address to be stored on the primary blockchain, a secondary blockchain, a tertiary blockchain, and/or other blockchains that may be provided as part of the system. As such, digital transactions that include digital transaction information may be broadcast by transaction devices and received by primary blockchain miner devices that maintain the primary blockchain. The primary blockchain miner devices may then identify that the digital transactions are directed to the primary blockchain address associated with the primary blockchain smart contract. In response, the primary miner devices access and execute the primary blockchain smart contract to cause a first subset of the digital transaction information to be stored on the primary blockchain, a second subset of the digital transaction information to be stored on the secondary blockchain, and so on. As such, any digital transactions directed to the primary blockchain address will have subsets of their digital transaction information stored on different blockchains, segregating that digital transaction information.

The segregated digital transaction information may then be access controlled. For example, the storage of the second subset of digital transaction information on the secondary blockchain may cause the generation, allocation, and/or other provisioning of a secondary blockchain access token or cryptocurrency. That secondary blockchain access token or cryptocurrency (or a portion thereof) may be provided to devices that wish to access the second subset of digital transaction information (e.g., by sending the secondary blockchain access token or cryptocurrency to the secondary blockchain address with which the second subset of digital transaction information is associated with in the secondary blockchain). In some examples, the second subset of digital transaction information included in the digital transactions that are initially sent to the primary blockchain may be encrypted, with the secondary blockchain access token or cryptocurrency (or a portion thereof) utilized to decrypt that second subset of digital transaction information (when it is stored on the secondary blockchain) as well. As such, secondary blockchain miner devices that maintain the secondary blockchain may receive a subsequent transaction that includes the secondary blockchain access token or cryptocurrency (or a portion thereof) and that is directed to a secondary blockchain address that is associated with the second subset of digital transaction information. In response, the secondary blockchain miner devices provide the second subset of digital transaction information to the device that transmitted that secondary blockchain access token or cryptocurrency (or a portion thereof).

One of the many specific examples of the segregation of digital transaction information using the systems and methods of the present disclosure includes providing the primary blockchain discussed above as a "physical property" blockchain that tracks the ownership of physical property (e.g., real estate), the secondary blockchain discussed above as a "purchase price" blockchain that tracks the purchase prices paid for the physical property (e.g., real estate) tracked on the physical property blockchain, and the tertiary blockchain discussed above as an "easement" blockchain that tracks easements associated with the physical property (e.g., real estate) tracked on the physical property blockchain.

In such an example, a physical property digital transaction may be performed using the physical property blockchain (e.g., by an owner of a physical property using a transaction device to broadcast the physical property digital transaction to the physical property blockchain miner devices that maintain the physical property blockchain), and may include physical property digital transaction information that provides for the transfer of a physical property whose ownership is tracked via the physical property blockchain, purchase price digital transaction information that details the price paid for the purchase of the physical property, and easement digital transaction information that details usage limitations associated with the physical property.

Furthermore, the purchase price digital transaction information may be encrypted or otherwise not viewable. When the physical property digital transaction is directed to a physical property blockchain address associated with a smart contract according to the teachings of the present disclosure, the execution of the smart contract may cause the physical property digital transaction information to be stored on the physical property blockchain, the purchase price digital transaction information to be stored on the purchase price blockchain, and easement digital transaction information to be stored on the easement blockchain. As such, information on the physical property blockchain, the purchase price blockchain, and the easement blockchain may be segregated and access controlled (and in the case of the purchase price digital transaction information, decrypted), as discussed herein.

In another specific example of the segregation of digital transaction information using the systems and methods of the present disclosure, online purchase digital transactions may have their digital transaction information segregated via the primary blockchain discussed above as a "cryptocurrency" blockchain that tracks the ownership of cryptocurrency (e.g., used to make the online purchase), the secondary blockchain discussed above as a "item details" blockchain that details the items purchased via the cryptocurrency transfer tracked on the cryptocurrency blockchain, and the tertiary blockchain discussed above as a "payment processor details" blockchain that tracks details the payment processor used to make the online purchase via the cryptocurrency transfer tracked on the cryptocurrency blockchain.

In such an example, a cryptocurrency digital transaction may be performed using the cryptocurrency blockchain (e.g., by an owner of a cryptocurrency using a transaction device to broadcast the cryptocurrency digital transaction to the cryptocurrency blockchain miner devices that maintain the cryptocurrency blockchain). The cryptocurrency digital transaction may include cryptocurrency digital transaction information that provides for the transfer of a cryptocurrency whose ownership is tracked via the cryptocurrency blockchain, item details digital transaction information that details the items paid for via the transfer of the cryptocurrency, and payment processor digital transaction information that details the payment processor utilized in purchasing the items using the cryptocurrency.

Furthermore, the item details digital transaction information may be encrypted or otherwise not viewable. When the cryptocurrency digital transaction is directed to a cryptocurrency blockchain address associated with a smart contract according to the teachings of the present disclosure, the execution of the smart contract may cause the cryptocurrency digital transaction information to be stored on the cryptocurrency blockchain, the item details digital transaction information to be stored on the item details blockchain, and payment processor digital transaction information to be stored on the payment processor details blockchain. As such, information on the cryptocurrency blockchain, the item details blockchain, and the payment processor details blockchain may be segregated and access controlled (and in the case of the item details digital transaction information, decrypted), as discussed herein. However, while specific examples are provided herein, one of skill in the art in possession of the present disclosure will recognize that the segregation and access controller of any of a variety of digital transaction information in a similar manner will fall within the scope of the present disclosure as well.

Referring now to FIG. 1, a method 100 for segregating digital transaction information using multiple blockchains is illustrated. In some embodiments of the method 100 described below, one or more miner devices may operate to perform or enable the method 100. In various embodiments, any or all of the blockchains provided according to the teachings of the present disclosure may be centralized or decentralized. For example, a centralized blockchain may be maintained by a one or more miner devices controlled by a single entity, or a plurality of miner devices controlled by a plurality of entitles (e.g., a consortium of entities that utilize the systems and methods of the present disclosure). In another example, a decentralized blockchain may be maintained by a plurality of miner devices, subsets of which are controlled by different entities. Furthermore, in some embodiments, some blockchains utilized by the systems and methods of the present disclosure may be decentralized (e.g., the primary blockchains discussed below), while other blockchains utilized by the systems and methods of the present disclosure may be centralized (e.g., the secondary, tertiary, and/or other blockchains discussed herein).

In a specific example, a distributed group of miner devices may operate to maintain the blockchains discussed below by creating (a.k.a., "mining") a cryptocurrency, processing transactions involving the cryptocurrency, and/or otherwise performing actions that produce the blocks utilized in the blockchains in the method 100 as detailed herein. In a specific example, a payment service provider such as, for example, PayPal, Inc. of San Jose, CA, may utilize a payment service provider device to perform the method 100 discussed herein (e.g., to maintain a centralized blockchain as discussed herein), and in some embodiments may operate in cooperation with one or more other system providers (e.g., a consortium of entities maintaining a centralized blockchain), miner devices, and/or transaction devices, to perform the method 100 discussed herein. However, these embodiments are meant to be merely exemplary, and one of skill in the art in possession of the present disclosure will recognize that a wide variety of system providers may operate, alone or together, to provide the systems and methods discussed herein without departing from the scope of the present disclosure.

Figure 2:
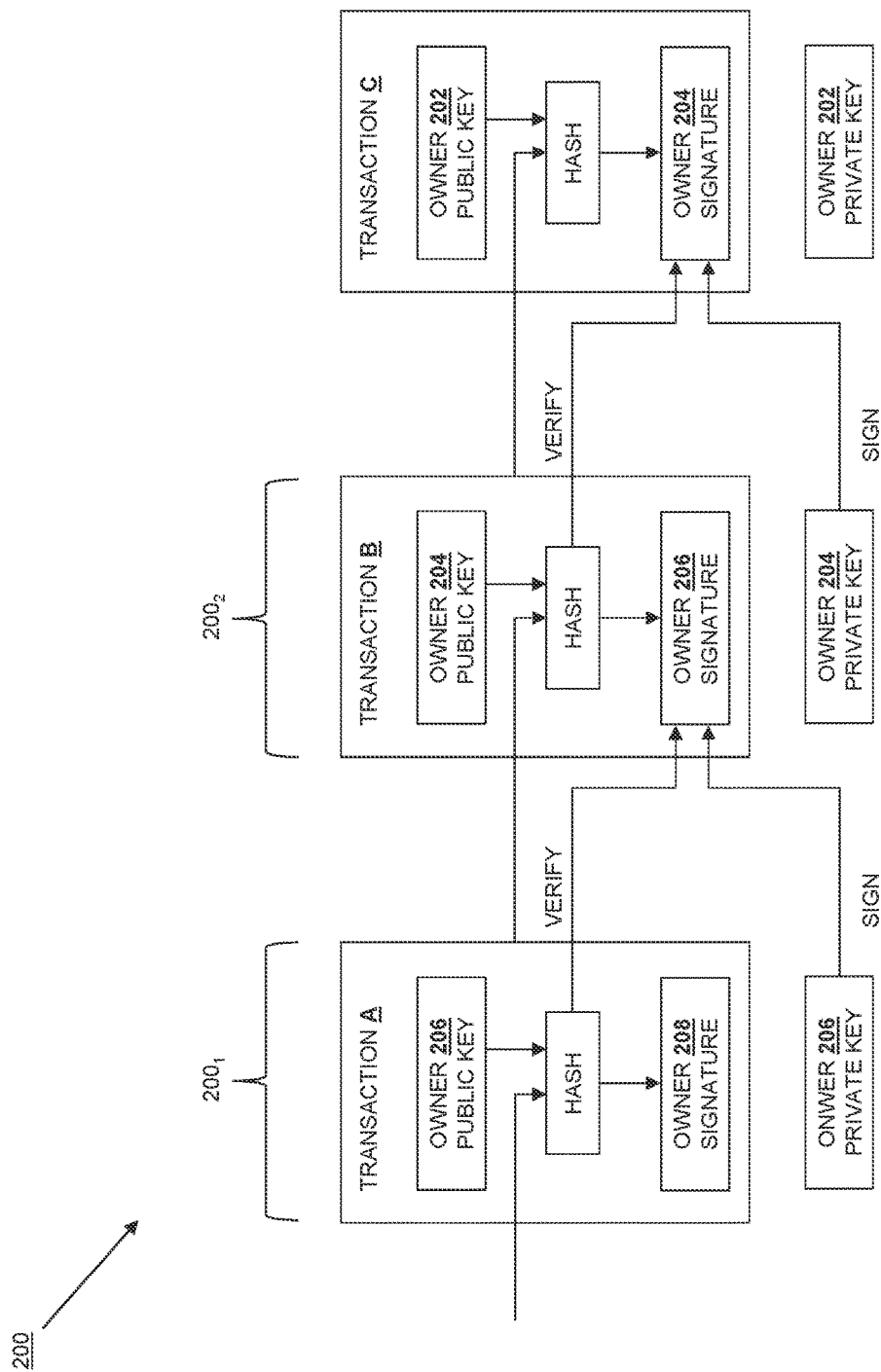
FIG. 2 is a schematic view illustrating an embodiment of an electronic coin, token, or cryptocurrency.

Referring now to FIG. 2, an embodiment of an electronic coin, token, or cryptocurrency 200 is illustrated and described briefly for reference to the blockchains used in the method 100 discussed herein. In those embodiments, a cryptocurrency blockchain system associated with the present disclosure defines an electronic coin, token, or cryptocurrency ("electronic coin" below) as a chain of digital signatures provided by previous owners of the electronic coin to subsequent owners of the electronic coin. In the illustrated embodiment, the electronic coin 200 is owned by an owner 202, and FIG. 2 illustrates how the electronic coin 200 is defined by the digital signatures of the previous owners 204, 206, and 208. Specifically, in transaction A, a hash of the public key of owner 206 (i.e., the owner receiving, as a result of transaction A, an electronic coin $200_1$ defined by digital signatures provided up to transaction A) and the previous transaction (not illustrated, but occurring prior to transaction A) was signed by owner 208 (i.e., the owner providing, as a result of transaction A, the electronic coin $200_1$ defined by digital signatures provided up to transaction A) and added to an initial electronic coin (which was defined by digital signatures provided up to the transaction prior to transaction A) such that the electronic coin $200_1$ was transferred to owner 206.

Similarly, in transaction B, a hash of the public key of owner 204 (i.e., the owner receiving, as a result of transaction B, an electronic coin $200_2$ defined by digital signatures provided up to transaction B) and transaction A was signed by owner 206 and added to the electronic coin $200_1$ such that the electronic coin $200_2$ was transferred to owner 204. Similarly, in transaction C, a hash of the public key of owner 202 (i.e., the owner receiving, as a result of transaction C, the electronic coin 200 defined by digital signatures provided up to transaction C) and the transaction B was signed by owner 204 and added to the electronic coin $200_2$ such that the electronic coin 200 was transferred to owner 202. As is understood in the art, any payee receiving an electronic coin (e.g., owner 206 in transaction A, owner 204 in transaction B, and owner 202 in transaction C) can verify the signatures to verify the chain of ownership of the electronic coin. In the discussion below, it should be understood that the term "electronic coins", "tokens", and/or "cryptocurrency" is used to encompass any amount of electronic coins, tokens, or cryptocurrency, and in the embodiments discussed herein may include small fractions of a coin, token, or cryptocurrency (e.g., 0.00000001 coins, tokens, or cryptocurrency).

Figure 3:
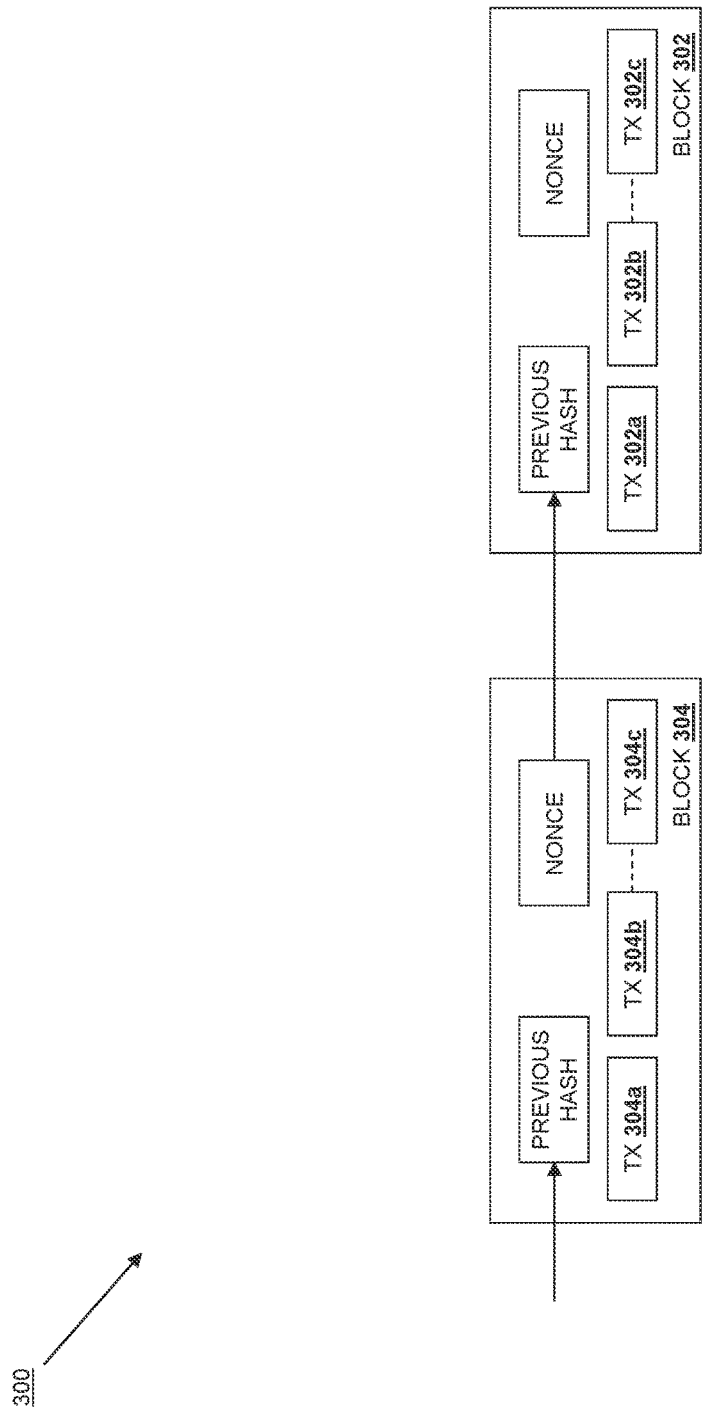
FIG. 3 is a schematic view illustrating an embodiment of a blockchain.

Referring now to FIG. 3, an embodiment of a cryptocurrency blockchain 300 is illustrated and described briefly for reference to the blockchains used in the embodiments of the method 100 discussed herein. Conventionally, the cryptocurrency blockchain 300 operates to verify that payers transferring an electronic coin, token, or cryptocurrency (e.g., referring back to FIG. 2, owner 206 in transaction A, owner 204 in transaction B, and owner 202 in transaction C) did not "double-spend" (e.g., sign any previous transactions involving) that electronic coin, token, or cryptocurrency. To produce the cryptocurrency blockchain 300, a distributed network of miner devices operates to agree on a single history of transactions in the order in which they were received such that it may be determined that a transaction between a payer and a payee using an electronic coin is the first transaction associated with that electronic coin. Each device in the distributed network operates to collect new transactions into a block, and then to increment a proof-of work system that includes determining a value that when hashed with the block provides a required number of zero bits.

For example, for a block 302 that includes a plurality of transactions 302a, 302b, and up to 302c, a miner device in the distributed network may increment a nonce in the block 302 until a value is found that gives a hash of the block 302 the required number of zero bits. The miner device may then "chain" the block 302 to the previous block 304 (which may have been "chained" to a previous block, not illustrated, in the same manner). When miner devices in the distributed network find the proof-of-work for a block, that block (e.g., block 302) is broadcast to the distributed network, and other miner devices in the distributed network will accept that block if all the transactions in it are valid and not already spent (which may be determined by creating the next block using the hash of the accepted block 302). The distributed network will consider the longest chain of blocks to be the correct one, and will operate to continue to extend it to generate the blockchain. If a miner device receives two different versions of a block, it will work on the first block received, but save the second block received in case the branch of the blockchain that includes the second block becomes longer (at which point that miner device with switch to working on the branch of the chain that includes the second block).

One of skill in the art in possession of the present disclosure will understand that the blockchain 300 operates to track, among other things, the associations of electronic coins, tokens, and/or cryptocurrency with blockchain addresses included on the blockchain. Furthermore, one of skill in the art in possession of the present disclosure will recognize that blockchain addresses may also be associated with smart contracts that may be stored on that blockchain, and executed by miner devices when transactions are directed to their respective blockchain addresses. As would be understood by one of skill in the art in possession of the present disclosure, smart contracts may be provided by self-executing code with the terms of the agreement between the parties directly written into lines of the code. The code and the agreements contained therein may be stored across a distributed, centralized/decentralized blockchain network, which allows the smart contracts to digitally facilitate, verify, or enforce the negotiation or performance of a contract, while rendering transactions traceable, transparent, and irreversible. The smart contracts of the present disclosure may be implemented using various smart contract development languages, using chaincode, and/or via a variety of smart contract provisioning techniques that will fall within the scope of the present disclosure.

In the systems and methods of the present disclosure, one or more smart contracts may be provided on one or more blockchains (in association with blockchain addresses on those blockchains) by creating a transaction that is directed to a blockchain address included on any particular blockchain, with the transaction including the code that provides the smart contract. As such, prior to the method 100, a system provider device may create such transaction(s) to provide the smart contract(s) discussed herein on the blockchain(s) and in association with blockchain addresses included on those blockchains.

Figure 4:
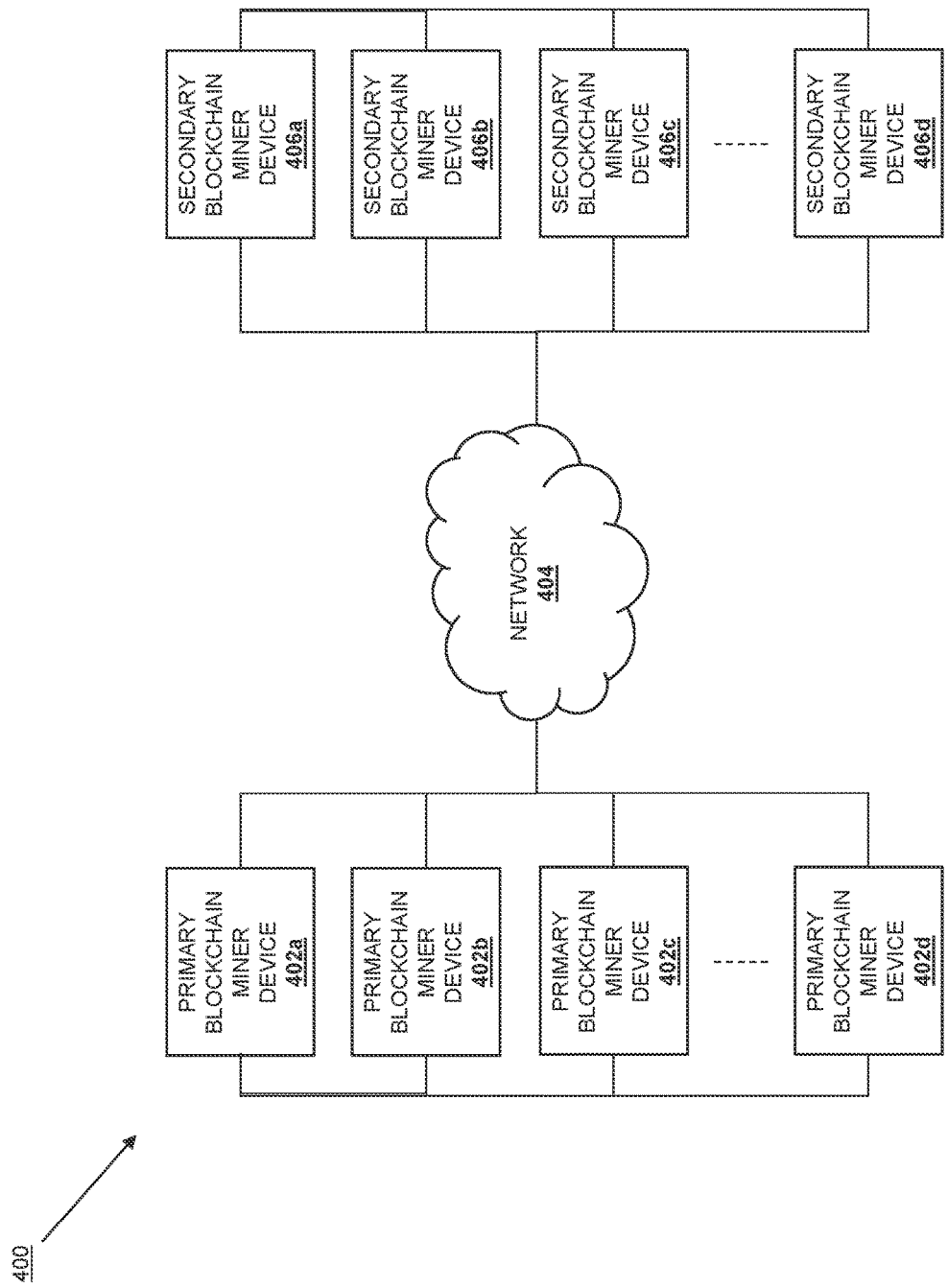
FIG. 4 is a schematic view illustrating an embodiment of a network including miner devices for multiple blockchains.

Referring now to FIG. 4, an embodiment of a multi-blockchain digital transaction information segregation system 400 is illustrated. One of skill in the art in possession of the present disclosure will recognize that the embodiment illustrated in FIG. 4 has been simplified such that the system 400 only provides for two different blockchains. However, as discussed herein, any number of blockchains may be provided by blockchain miner devices in a manner similar to that described with reference to FIG. 4, and such multi-blockchain systems will fall within the scope of the present disclosure as well. The multi-blockchain digital transaction information segregation system 400 includes a plurality of primary blockchain miner devices such as, for example, the primary blockchain miner devices 402*a*, 402*b*, 402*c*, and up to 402*d*, each of which may be configured to maintain a primary blockchain as described herein. The primary blockchain miner devices 402*a-d* may be coupled to each other directly and/or via a network 404 such as, for example, the Internet. As discussed above, the primary blockchain maintained by the primary blockchain miner devices 402*a-d* may be a decentralized blockchain, with subsets of the primary blockchain miner devices controlled by different entities. In a specific example, the primary blockchain miner devices 402*a-d* may operate to maintain the Etherum blockchain, although other blockchains will fall within the scope of the present disclosure as well.

The multi-blockchain digital transaction information segregation system 400 also includes a plurality of secondary blockchain miner devices such as, for example, the secondary blockchain miner devices 406*a*, 406*b*, 406*c*, and up to 406*d*, each of which may be configured to maintain a secondary blockchain as described herein. The secondary blockchain miner devices 406*a-d* may be coupled to each other directly and/or via the network 406 as well. As such, the primary blockchain miner devices 402*a-d* and the secondary blockchain miner devices 406*a-d* are coupled to each other through the network 404. As discussed herein, the secondary blockchain maintained by the secondary blockchain miner devices 406*a-d* may be a centralized blockchain, with the secondary blockchain miner devices controlled by a single entity, or a group of entities that are part of a consortium. In such examples, particular secondary miner device(s) (referred to as "queen nodes" below) may be designated for controlling access to information stored on the secondary blockchain.

Figure 5:
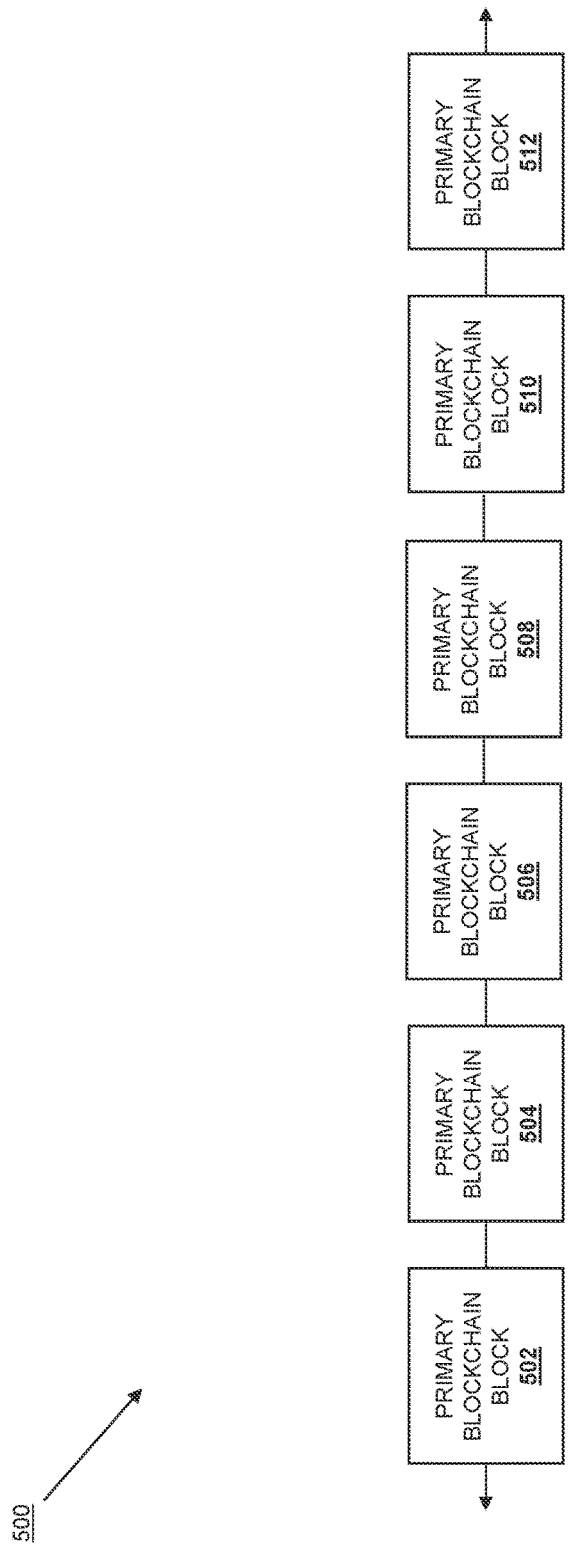
FIG. 5 is a schematic view illustrating an embodiment of a primary blockchain.

Referring now to FIG. 5, an embodiment of a portion of a primary blockchain 500 is illustrated that includes primary blockchain blocks 502, 504, 506, 508, 510, and 512, and one of skill in the art in possession of the present disclosure will recognize that the primary blockchain 500 includes many addition blocks, and may have blocks continuously added to it as described herein with reference to the blockchain 300. Furthermore, as described herein, the primary blockchain blocks in the primary blockchain 500 may provide for the storage of the smart contracts discussed herein, with may be added to the primary blockchain 500 by a system provider via a primary blockchain transaction that is added to any of the primary blockchain blocks in the primary blockchain 500.

Figure 6:
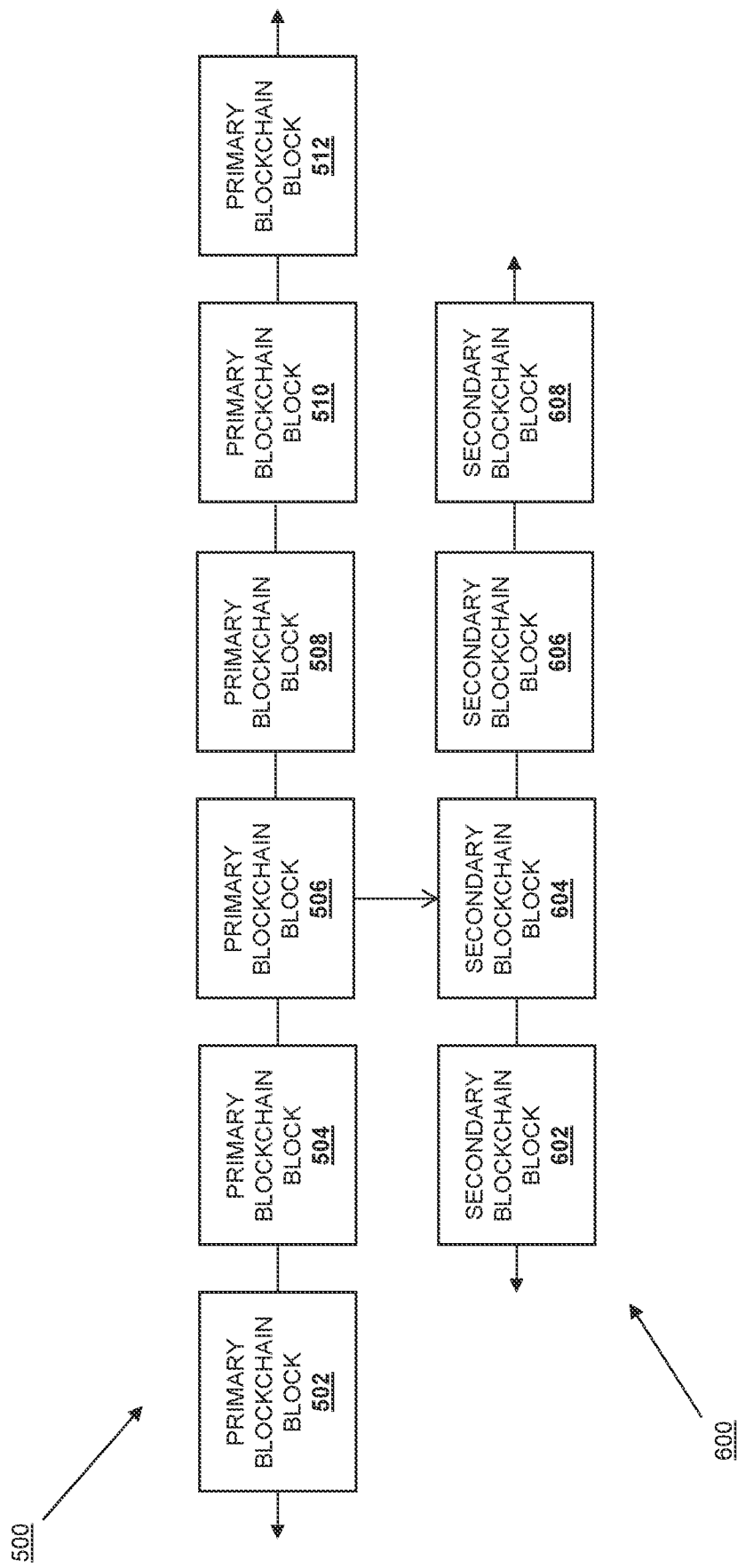
FIG. 6 is a schematic view illustrating an embodiment of the primary blockchain of FIG. 5, along with a secondary blockchain.

Referring now to FIG. 6, an embodiment of a portion of a secondary blockchain 600 is illustrated that includes secondary blockchain blocks 602, 604, 606, and 608, and one of skill in the art in possession of the present disclosure will recognize that the secondary blockchain 600 includes many additional blocks, and may have blocks continuously added to it as described above with reference to the blockchain 300. Furthermore, as described herein, the secondary blockchain blocks in the secondary blockchain 600 may provide for the storage of the smart contracts discussed herein, with may be added to the secondary blockchain 600 by a system provider via a secondary blockchain transaction that is added to any of the secondary blockchain blocks in the secondary blockchain 600. As described below, in some embodiments the secondary blockchain 600 may be provided by a "sidechain" that is linked to the primary blockchain 500. For example, the illustrated embodiment shows how a primary blockchain transaction confirmed in the primary blockchain block 506 of the primary blockchain 500 may generate a secondary blockchain transaction that is confirmed in the secondary blockchain block 604 of the secondary blockchain 600. Furthermore, as discussed herein, queen nodes may be designated for controlling access to the secondary blockchain 600, including controlling which digital transactions are added to the secondary blockchain 600, the retrieval of digital transaction information from the secondary blockchain 600, and/or providing for other access control that would be apparent to one of skill in the art in possession of the present disclosure.

Figure 7:
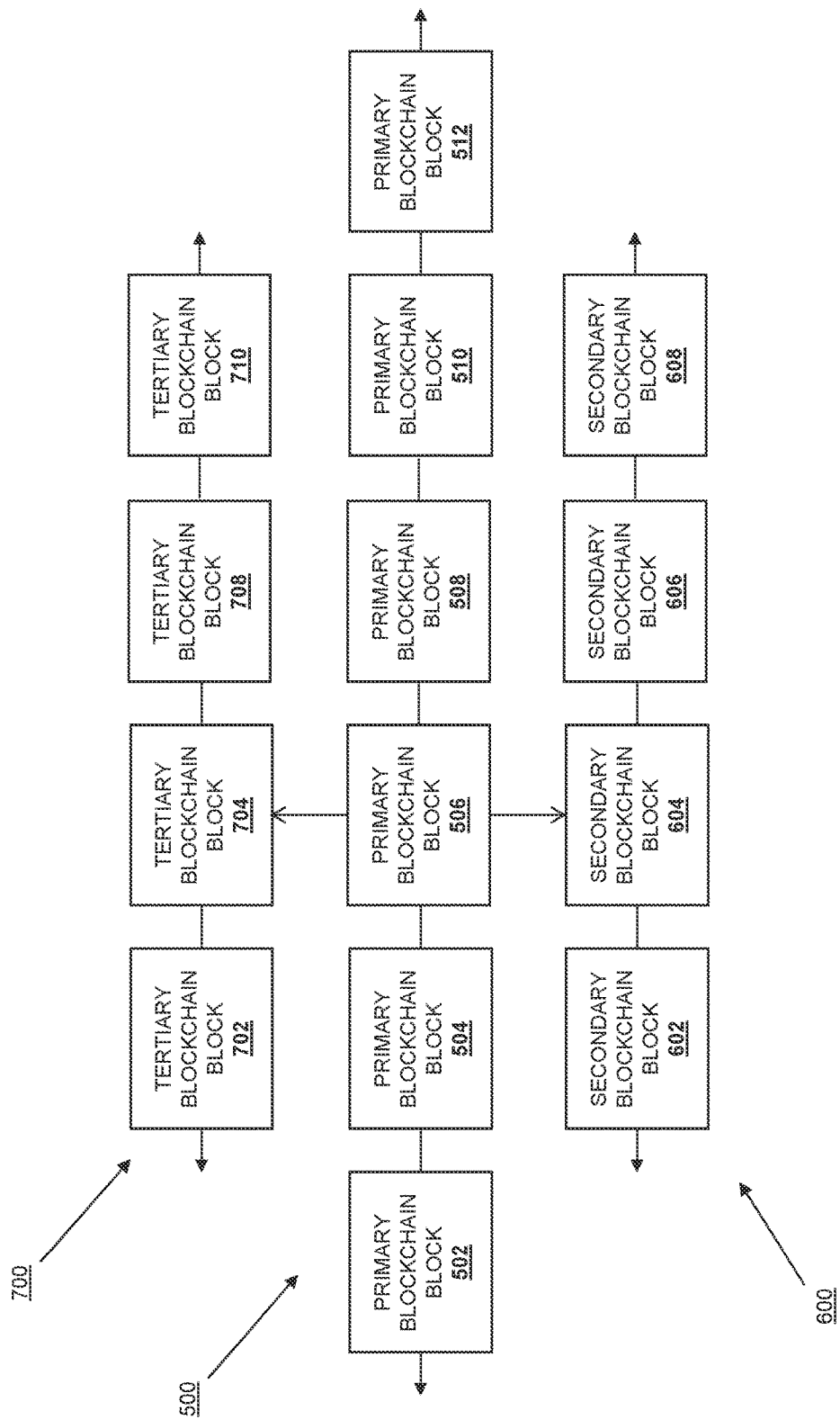
FIG. 7 is a schematic view illustrating an embodiment of the primary blockchain and the secondary blockchain of FIG. 6, along with a tertiary blockchain.

Referring now to FIG. 7, an embodiment of a portion of a tertiary blockchain 700 is illustrated that includes tertiary blockchain blocks 702, 704, 706, and 708, and one of skill in the art in possession of the present disclosure will recognize that the tertiary blockchain 700 includes many additional blocks, and may have blocks continuously added to it as described above with reference to the blockchain 300. Furthermore, as described above, the tertiary blockchain blocks in the tertiary blockchain 700 may provide for the storage of the smart contracts discussed herein, with may be added to the tertiary blockchain 700 by a system provider via a tertiary blockchain transaction that is added to any of the tertiary blockchain blocks in the tertiary blockchain 700. As described herein, in some embodiments the tertiary blockchain 700 may be provided by a "sidechain" that is linked to the primary blockchain 500. For example, the illustrated embodiment shows how a primary blockchain transaction confirmed in the primary blockchain block 506 of the primary blockchain 500 may generate a tertiary blockchain transaction that is confirmed in the tertiary blockchain block 704 of the tertiary blockchain 700. Furthermore, as discussed herein, queen nodes may be designated for controlling access to the tertiary blockchain 700, including controlling which digital transactions are added to the tertiary blockchain 700, the retrieval of digital transaction information from the tertiary blockchain 700, and/or providing for other access control that would be apparent to one of skill in the art in possession of the present disclosure.

Figure 8:
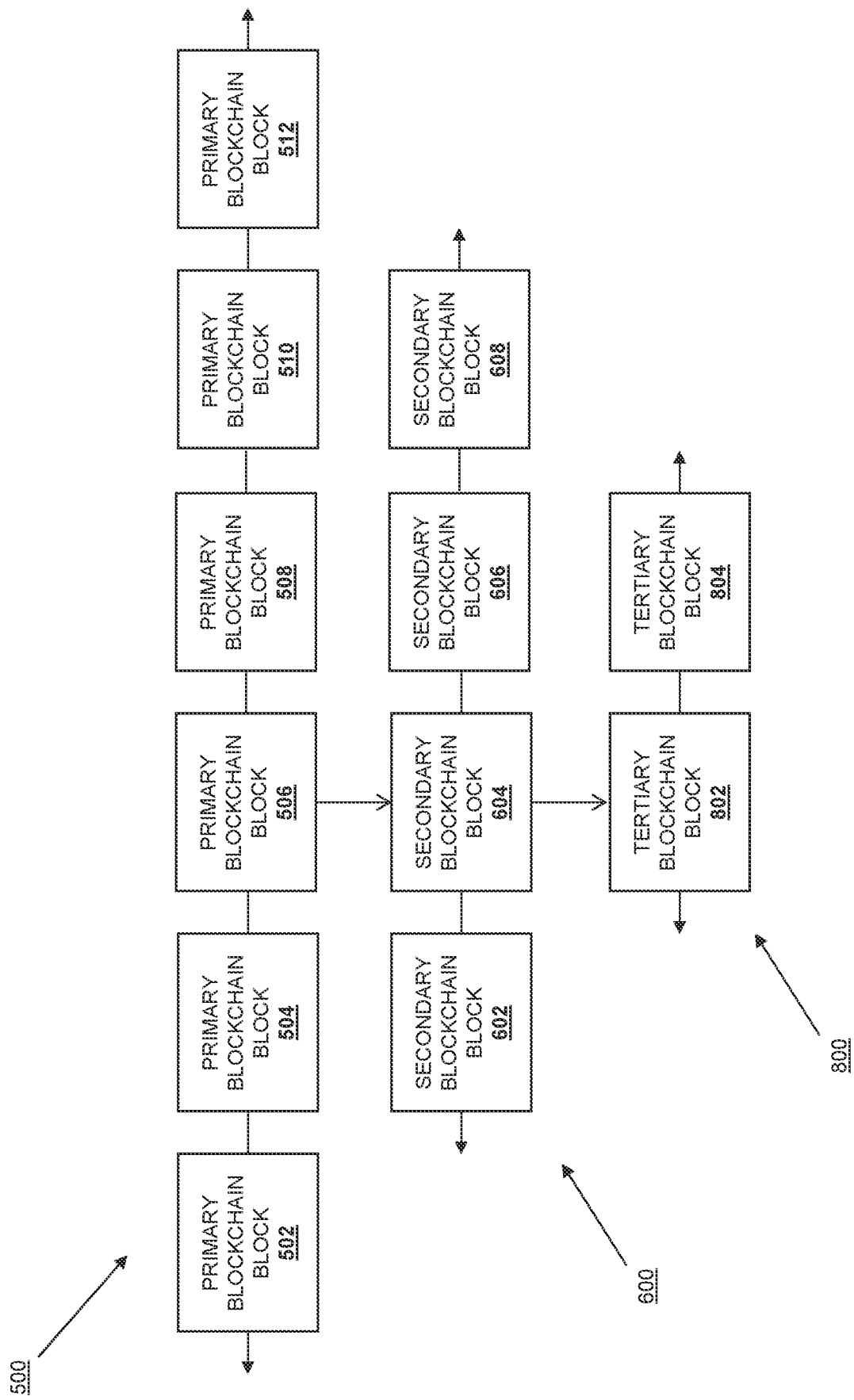
FIG. 8 is a schematic view illustrating an embodiment of the primary blockchain and the secondary blockchain of FIG. 6, along with a tertiary blockchain.

Referring now to FIG. 8, an embodiment of a portion of a tertiary blockchain 800 is illustrated that includes tertiary blockchain blocks 802 and 804, and one of skill in the art in possession of the present disclosure will recognize that the tertiary blockchain 800 includes many additional blocks, and may have blocks continuously added to it as described above with reference to the blockchain 300. Furthermore, as described above, the tertiary blockchain blocks in the tertiary blockchain 800 may provide for the storage of the smart contracts discussed above, with may be added to the tertiary blockchain 800 by a system provider via a tertiary blockchain transaction that is added to any of the tertiary blockchain blocks in the tertiary blockchain 800. As described below, in some embodiments the tertiary blockchain 800 may be provided by a "sidechain" that is linked to the secondary blockchain 600. For example, the illustrated embodiment shows how a secondary blockchain transaction confirmed in the secondary blockchain block 604 of the secondary blockchain 600 may generate a tertiary blockchain transaction that is confirmed in the tertiary blockchain block 802 of the tertiary blockchain 800. Furthermore, as discussed above, queen nodes may be designated for controlling access to the tertiary blockchain 800, including controlling which digital transactions are added to the tertiary blockchain 800, the retrieval of digital transaction information from the tertiary blockchain 800, and/or providing for other access control that would be apparent to one of skill in the art in possession of the present disclosure.

Returning to the method 100 of FIG. 1, the method 100 begins at block 102 where a transaction device broadcasts a digital transaction that includes digital transaction information to a primary blockchain. In an embodiment, transaction devices that broadcast digital transaction at block 102 may be provided by any computing device that is configured (e.g., via software) to generate and broadcast transactions to the primary blockchain miner devices 402a-d that maintain the primary blockchain 500. In conventional blockchain systems, such transaction devices are referred to as "nodes" that are configured with "wallet software" that enables those nodes to broadcast digital cryptocurrency transactions that transfer cryptocurrency from a first blockchain address included on the blockchain to a second blockchain address included on the blockchain, either to provide for a basic cryptocurrency transaction (e.g., as is provided by the Bitcoin network), and/or to provide for the execution of a smart contract (e.g., as is provided by the Ethereum network). As such, the transaction devices of the present disclosure may be provided by nodes that include software that enable those nodes to generate and broadcast transactions for inclusion on the primary blockchain 500, which may include cryptocurrency transfers, smart contract execution, and/or combinations thereof. Using the specific example above of the physical property blockchain provided as the primary blockchain, transaction devices may be controlled by participants in the system that own physical property by virtue of that ownership being recorded on the physical property blockchain.

As such, at block 102, the transaction device may generate a digital transaction that includes digital transaction information that describes different details of that digital transaction, and then broadcast that digital transaction to the network 404 such that it is received by the primary blockchain miner devices 402a-d that maintain the primary blockchain 500. In different examples, the digital transaction information included in the digital transaction will differ depending on the type or purpose of the digital transaction. For example, using the physical property blockchain examples provided above, the digital transaction information for a physical property transaction may include information that provides for the transfer of physical property from the first user (who currently owns the physical property according to the physical property blockchain) to a second user (who may receive ownership of that physical property via a physical property blockchain address on the physical property blockchain). Furthermore, the digital transaction information for the physical property transaction may include purchase price information that details the price paid for the physical property by the second user to the first user. In some instances, the digital transaction information may include details of a cryptocurrency transaction that provides for the transfer of an amount of cryptocurrency from the second user purchasing the physical property to the first user selling the physical property. Further still, the digital transaction information for the physical property transaction may include information that details easements (or other usage restrictions) associated with the physical property being transferred from the first user to the second user.

In another example, the digital transaction information for an online payment transaction may include information that provides for the transfer of cryptocurrency from a first user (who currently owns the cryptocurrency according to a cryptocurrency blockchain) to a second user (who may receive ownership of that cryptocurrency via a cryptocurrency blockchain address on the cryptocurrency blockchain). Furthermore, the digital transaction information for the online payment transaction may include information that details the item that was purchased from the second user by the first user. Further still, the digital transaction information for the online payment transaction may include information that details a payment processor (e.g., PAYPAL®, APPLE®, GOOGLE®, etc.) and/or payment processor details associated with the online payment transaction. While a few specific examples have been described, one of skill in the art in possession of the present disclosure will recognize that any digital transaction may include any of a variety of associated digital transaction information that will fall within the scope of the present disclosure.

Furthermore, the digital transaction broadcast at block 102 may be directed to a primary blockchain address that, as discussed herein, is associated with a smart contract that provides for the digital transaction information segregation of the present disclosure. As such, in some examples, the digital transaction may identify a first primary blockchain address that is controlled by the counterparty in the digital transaction (e.g., via private keys that verify ownership of the first primary blockchain address, as discussed herein) and that need not be associated with a smart contract, while being directed to a second primary blockchain address that is associated with the smart contract that provides the functionality discussed herein. For example, the digital transaction may be directed to the second primary blockchain address, and may identify the first primary blockchain address in order to allow a primary blockchain transaction (e.g., the physical property ownership transaction or the cryptocurrency transaction discussed below) to be performed with that first primary blockchain address.

However, in other examples, the digital transaction broadcast at block 102 may be both controlled by the counterparty in the digital transaction, and may be associated with the smart contract that provides the functionality discussed herein. As such, in some embodiments, each participant in the system that is to receive a digital transaction with digital transaction information that should be segregated may be provided a primary blockchain address that they control (e.g., via private keys that may be used to digitally sign transactions associated with that primary blockchain address, as discussed above with reference to FIG. 2), and that includes a smart contract that provides the digital transaction information segregation detailed herein.

The method 100 then proceeds to block 104 where primary blockchain miner devices receive the digital transaction and identify a primary blockchain address to which that digital transaction is directed. As discussed above with reference to FIG. 3, transactions broadcast by nodes in a blockchain system may be received by miner devices that maintain the blockchain in that blockchain system, and provided in blocks that are added to that blockchain. At block 104, any or all of the primary blockchain miner devices 402a-d may receive the digital transaction broadcast by the transaction device at block 102 and, in response, identify a primary blockchain address to which they are directed. As discussed herein, in some examples, a single primary blockchain address may include a smart contract that provides for the digital transaction information segregation of the present disclosure, and thus all digital transactions that are to have their digital transaction information segregated will be sent to that same primary blockchain address. However, in other examples, each participant in the system that wishes to receive a digital transaction that is to have its digital transaction information segregated may be provided a different primary blockchain address that has been associated with the smart contract that provides for the digital transaction information segregation of the present disclosure, and thus each digital transaction that is to have its digital transaction information segregated may be sent to a different primary blockchain address. In either example, any primary blockchain miner device 402a-d receiving a digital transaction at block 104 may identify the primary blockchain address to which that digital transaction is directed.

The method 100 then proceeds to block 106 where the primary blockchain miner devices access a primary blockchain smart contract that is associated with the primary blockchain address identified at block 104. As discussed above, a smart contract may be stored on the primary blockchain 500 in association with any primary blockchain address included in that primary blockchain 500, and thus at block 106 the identification of the primary blockchain address allows for the retrieval of the code that provides that smart contract. As such, any of the primary blockchain miner devices 402a-d may retrieve the code for the smart contract from the primary blockchain 500 by accessing the primary blockchain address identified at block 104.

The method 100 then proceeds to block 108 where the primary blockchain miner devices execute the primary blockchain smart contract to cause subsets of the digital transaction information to be stored on different blockchains. In an embodiment, the execution of the smart contract at block 108 may cause a first subset of digital transaction information included in the digital transaction to be stored on the primary blockchain 500, a second subset of the digital transaction information included in the digital transaction to be stored on the secondary blockchain 600, a third subset of the digital transaction information to be stored on the tertiary blockchains 700 and/or 800, and so on.

For example, in situations like those described above in which a single primary blockchain address is associated with the smart contract that provides the digital transaction information segregation functionality of the present disclosure, the execution of the smart contract at block 108 may identify a first subset of the digital transaction information in the digital transaction, and generate and broadcast a transaction to the primary blockchain 500 that causes that first subset of the digital transaction information to be stored in association with a different primary blockchain address (e.g., a primary blockchain address that is not associated with a smart contract) on the primary blockchain 500.

Using one of the specific examples provided above, the first subset of the digital transaction information may detail the transfer of physical property, and the smart contract may provide for the identification of the primary blockchain address controlled by the participant in the system that is to be recorded as the owner of the physical property (and that need not be associated with a smart contract), and the generation and broadcasting of a transaction that transfers the ownership of that physical property to that participant. Using another of the specific examples provided above, the first subset of the digital transaction information may detail an online purchase transaction, and the smart contract may provide for the identification of the primary blockchain address controlled by the participant in the system that is to receive payment for the online purchase transaction (and that need not be associated with a smart contract), and the generation and broadcasting of a transaction that transfers a cryptocurrency to that participant at that primary blockchain address.

In another example, in situations like those described above in which multiple primary blockchain addresses are associated with the smart contract that provides the digital transaction information segregation functionality of the present disclosure, the execution of the smart contract at block 108 may simply allow a first subset of the digital transaction information in the digital transaction to be recorded in association with that primary blockchain address on the primary blockchain 500.

Using one of the specific examples provided above, the first subset of the digital transaction information may detail the transfer of physical property, and the smart contract may provide for the participant in the system that controls that primary blockchain address to be recorded as the owner of that physical property via that primary blockchain address. Using another of the specific examples provided above, the first subset of the digital transaction information may detail an online purchase transaction, and the smart contract may provide for the generation and broadcasting of a transaction that transfers a cryptocurrency to that participant at that primary blockchain address.

In either example, the execution of the smart contract at block 108 may identify a second subset of the digital transaction information in the digital transaction, and generate and broadcast a transaction to the secondary blockchain 600 that causes that second subset of the digital transaction information to be stored in association with a secondary blockchain address on the secondary blockchain 600. In some examples, the queen nodes discussed above are configured to regulate or otherwise control access to the secondary blockchain (and/or the tertiary blockchain), and may receive the second subset of the digital transaction information (and/or the third subset of the digital transaction information) provided as per the smart contract, and then provide for the storage of that second subset of digital transaction information on the secondary blockchain. As such, queen node(s) controlling access to the secondary blockchain may enforce rules for adding digital transaction information to the secondary blockchain.

Using one of the specific examples provided above, the second subset of the digital transaction information may detail the amount paid for the physical property, and the smart contract may provide for the identification of a secondary blockchain address that is designated for the storage of the price paid for the physical property (or designated for providing for the transfer of a cryptocurrency as part of the purchase of the physical property), and the generation and broadcasting of a transaction that records the price paid for the physical property on the secondary blockchain 600 (or provides for the transfer of a cryptocurrency to purchase the physical property). As discussed above, the second subset of the digital transaction information (e.g., the price paid for the physical property) may be encrypted in the initial digital transaction, and thus may be stored in the secondary blockchain 600 in an encrypted manner as well.

Using another of the specific examples provided above, the second subset of the digital transaction information may detail item(s) purchased in an online purchase transaction. The smart contract may then provide for the identification of a secondary blockchain address that is designated for the storage of the details of the item(s), and the generation and broadcasting of a transaction that records the details of the item(s) on the secondary blockchain 600. As discussed above, the second subset of the digital transaction information (e.g., the details of the item(s) purchased) may be encrypted in the initial digital transaction, and thus may be stored in the secondary blockchain 600 in an encrypted manner as well.

Furthermore, the execution of the smart contract at block 108 may identify a third subset of the digital transaction information in the digital transaction, and generate and broadcast a transaction to the tertiary blockchain 700 and/or that causes that third subset of the digital transaction information to be stored in association with a tertiary blockchain address on the tertiary blockchain 700. Furthermore, queen node(s) may control access to the tertiary blockchain 700 by enforcing rules about what digital transaction information may be stored on the tertiary blockchain 700.

Using the specific example provided below, the third subset of the digital transaction information may detail easements associated with the physical property, and the smart contract may provide for the identification of a tertiary blockchain address that is designated for the storage of the easements associated with the physical property, and the generation and broadcasting of a transaction that records the easements associated with the physical property on the tertiary blockchain 700.

Using another of the specific examples provided above, the third subset of the digital transaction information may detail payment processor information about a payment processing used to make the purchase in an online purchase transaction, and the smart contract may provide for the identification of a secondary blockchain address that is designated for the storage of the details of the payment processor, and the generation and broadcasting of a transaction that records the details of the payment processor on the secondary blockchain 600.

FIG. 7 illustrates how the smart contract stored on the primary blockchain address included on the primary blockchain 500 may provide for both the storage of the second subset of digital transaction information on the secondary blockchain 600, and the storage of the third subset of digital transaction information on the tertiary blockchain 700, with each of the secondary blockchain 600 and the tertiary blockchain 700 provided as direct "sidechains" from the primary blockchain 500. However, FIG. 8 illustrates how a smart contract associated with the primary blockchain address included on the primary blockchain 500 may provide for the storage of the second subset of digital transaction information on the secondary blockchain 600, while a smart contract associated with a secondary blockchain address included on the secondary blockchain 600 may provide for the storage of the third subset of digital transaction information on the tertiary blockchain 800. As such, the embodiment of FIG. 8 illustrates the concept of "nested sidechains", where a first sidechain is directly accessible via transactions on the primary blockchain, and a second sidechain is accessible via transactions on the first sidechain.

For example, the smart contract associated with the primary blockchain address included on the primary blockchain 500 may provide for the storage of all digital transaction information other than the first subset of digital transaction information on the secondary blockchain 600, while the smart contract associated with a secondary blockchain address included on the secondary blockchain 600 may provide for the storage of all remaining digital transaction information (i.e., minus the first subset of digital transaction information stored on the primary blockchain 500) other than the second subset of digital transaction information on the tertiary blockchain 800. Similarly, a smart contract associated with a tertiary blockchain address included on the tertiary blockchain 800 may provide for the storage of all remaining digital transaction information (i.e., minus the first subset and second subset of digital transaction information stored on the primary blockchain 500 and the secondary blockchain 600, respectively) other than the third subset of digital transaction information on a different blockchain (not illustrated), and so on. As such, nested sidechains/blockchains such as those illustrated in FIG. 8 may include smart contracts across the different blockchains that performs handoffs of digital transaction information until each subset of that digital transaction information is stored in a desired blockchain.

The method 100 then proceeds to block 110 where the miner devices provide access to the digital transaction information. As discussed above, blocks 102-108 of the method 100 provide for the segregation of different subsets of digital transaction information associated with a digital transaction in different blockchains. Following the storage of the different subsets of digital transaction information in the different blockchains as discussed above, the miner devices may operate to provide access to that different digital transaction information via transactions directed to their associated blockchain addresses. As discussed above, queen nodes may be provided to control access to information stored on any or all of the primary blockchains, secondary blockchains, tertiary blockchains, etc., described herein.

For example, the execution of the smart contract at block 108 to store the second subset of the digital transaction information on the secondary blockchain 600 may also include the generation and/or allocation of a secondary blockchain token that may be stored by the miner device and/or provided to the transaction device for storage, and that may be configured to provide access to the second subset of digital transaction information. Furthermore, in situations where access to the second subset of the digital transaction information is desired by someone other than the participant controlling the transaction device (a "first transaction device" in this example), a portion of that secondary blockchain token may be provided to a second transaction device to allow access to that second subset of the digital transaction information (e.g., via a similar transaction to that secondary blockchain address that includes a portion of that secondary blockchain token).

As such, any participant in the system that wishes to access the second subset of the digital transaction information that was stored on the secondary blockchain 600 may be required to first be allocated a portion of the secondary blockchain token. That participant may then generate and broadcast transactions that send that portion of the secondary blockchain token to the secondary blockchain address at which the second subset of the digital transaction information is stored in order to have the secondary blockchain miner devices 406*a-d* provide access to the second subset of digital transaction information. In some embodiments, the secondary blockchain token may provide for the decryption of the second subset of digital transaction information in situations where that second subset of digital transaction information has been encrypted.

In yet other embodiments, cryptocurrency sent to the secondary blockchain address associated with the second subset of digital transaction information may result in access to that second subset of digital transaction information. For example, the secondary blockchain miner devices may receive a digital transaction that was broadcast by a transaction device, that is directed to the secondary blockchain address associated with the storage of the second subset of digital transaction information, and that includes an amount of cryptocurrency. If that amount of cryptocurrency is sufficient to obtain access to the second subset of digital transaction information (e.g., the owner of the second subset of digital transaction information may require some particular amount of cryptocurrency to obtain access), the secondary blockchain miner devices 406*a-d* may provide that access.

Thus, systems and methods have been described that utilize multiple blockchains to segregate digital transaction information included in any particular digital transaction. A primary blockchain smart contract may be provided in association with a primary blockchain address included in a primary blockchain, with that primary blockchain smart contract configured to cause different digital transaction information included in digital transactions directed to that primary blockchain to be stored on a secondary blockchain, a tertiary blockchain, and/or other blockchains that may be provided in the system. As such, digital transactions received by primary blockchain miner devices that maintain the primary blockchain are identified as directed to the primary blockchain address and, in response, the smart contract is accessed and executed to cause a first subset of the digital transaction information to be stored on the primary blockchain, and the second subset of the digital transaction information to be stored on the secondary blockchain, and so on. As such, any digital transactions directed to the primary blockchain address will have subsets of their digital transaction information stored on different blockchains, segregating that digital transaction information.

As a result, digital transactions are enabled via a primary blockchain, with the ability to store portions of the digital transaction information included in those digital transactions on other blockchains, thus reducing the size of the primary blockchain, and segregating different digital transaction information included in digital transactions to other blockchains, which allows for a variety of access control scenarios for the different digital transaction information. As such, continuing with the example of the physical property digital transactions discussed above, a physical property blockchain may be provided that tracks the ownership of physical property and allows transfers of ownership of physical property via digital transaction recorded on the physical property blockchain. However, digital transaction information included in those digital transactions and related to the purchase price and easements associated with that physical property may be stored on separate blockchains, which may be accessed controlled (e.g., by the queen nodes discussed above). The access control may restrict access to that digital transaction information (e.g., by providing for the encryption of the purchase price information when stored, and decryption of that information when access is provided), or simply segregate that digital transaction information (e.g., the easement information) to an easement blockchain so that it need not be recorded on the physical property blockchain and instead can be accessed by those interested on the easement blockchain.

Similarly, continuing with the example of the online purchase digital transactions discussed above, a cryptocurrency blockchain may be provided that tracks the ownership of cryptocurrency and allows transfers of cryptocurrency via digital transaction recorded on the cryptocurrency blockchain. However, digital transaction information included in those digital transactions and related to the item(s) purchased and payment processor used in the purchase may be stored on separate blockchains, which may be accessed controlled (e.g., by the queen nodes discussed above). The access control may restrict access to that digital transaction information (e.g., by providing for the encryption of the item detail information when stored, and decryption of that item detail information when access is provided), or simply segregate that digital transaction information (e.g., the payment processor information) to a payment processor blockchain so that it need not be recorded on the physical property blockchain and instead can be accessed by those interested on the payment processor blockchain.

Figure 9:
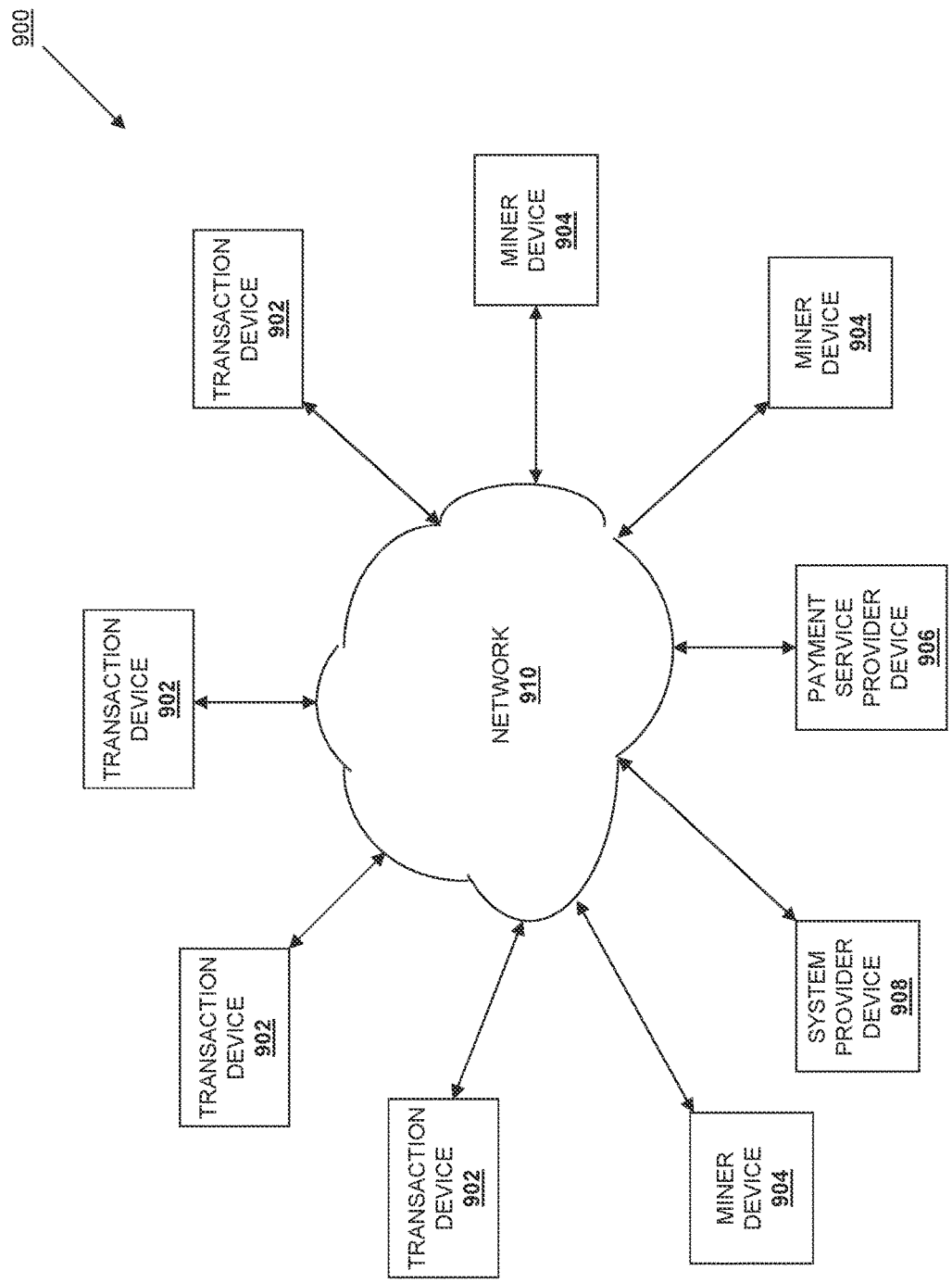
FIG. 9 is a schematic view illustrating an embodiment of a networked system.

Referring now to FIG. 9, an embodiment of a networked system 900 used in the systems and methods described above is illustrated. The networked system 900 includes a plurality of transaction devices 902, a plurality of miner devices 904, a payment service provider device 906, and a system provider device 908 in communication over a network 910.

The transaction devices 902, miner devices 904, payment service provider device 906, and system provider device 908 may each include one or more processors, memories, and other appropriate components for executing instructions such as program code and/or data stored on one or more computer readable mediums to implement the various applications, data, and steps described herein. For example, such instructions may be stored in one or more computer readable mediums such as memories or data storage devices internal and/or external to various components of the system 9900, and/or accessible over the network 910.

The network 910 may be implemented as a single network or a combination of multiple networks. For example, in various embodiments, the network 910 may include the Internet and/or one or more intranets, landline networks, wireless networks, and/or other appropriate types of networks.

The transaction devices 902 may be implemented using any appropriate combination of hardware and/or software configured for wired and/or wireless communication over network 910. For example, in one embodiment, the transaction devices 902 may be implemented as a personal computer of a user in communication with the Internet. In other embodiments, the transaction devices 902 may be a smart phone, wearable computing device, laptop computer, and/or other types of computing devices.

The transaction devices 902 may include one or more browser applications which may be used, for example, to provide a convenient interface to permit a payer to browse information available over the network 910. For example, in one embodiment, the browser application may be implemented as a web browser configured to view information available over the Internet.

The transaction devices 902 may also include one or more toolbar applications which may be used, for example, to provide user-side processing for performing desired tasks in response to operations selected by the user. In one embodiment, the toolbar application may display a user interface in connection with the browser application.

The transaction devices 902 may further include other applications as may be desired in particular embodiments to provide desired features to the transaction devices 902. In particular, the other applications may include a payment application for payments assisted by a payment service provider. The other applications may also include security applications for implementing user-side security features, programmatic user applications for interfacing with appropriate application programming interfaces (APIs) over the network 910, or other types of applications. Email and/or text applications may also be included, which allow the user to send and receive emails and/or text messages through the network 910. The transaction devices 902 include one or more user and/or device identifiers which may be implemented, for example, as operating system registry entries, cookies associated with the browser application, identifiers associated with hardware of the transaction devices 902, or other appropriate identifiers, such as a phone number. In one embodiment, the user identifier may be used to associate the user with a particular account as further described herein.

Figure 10:
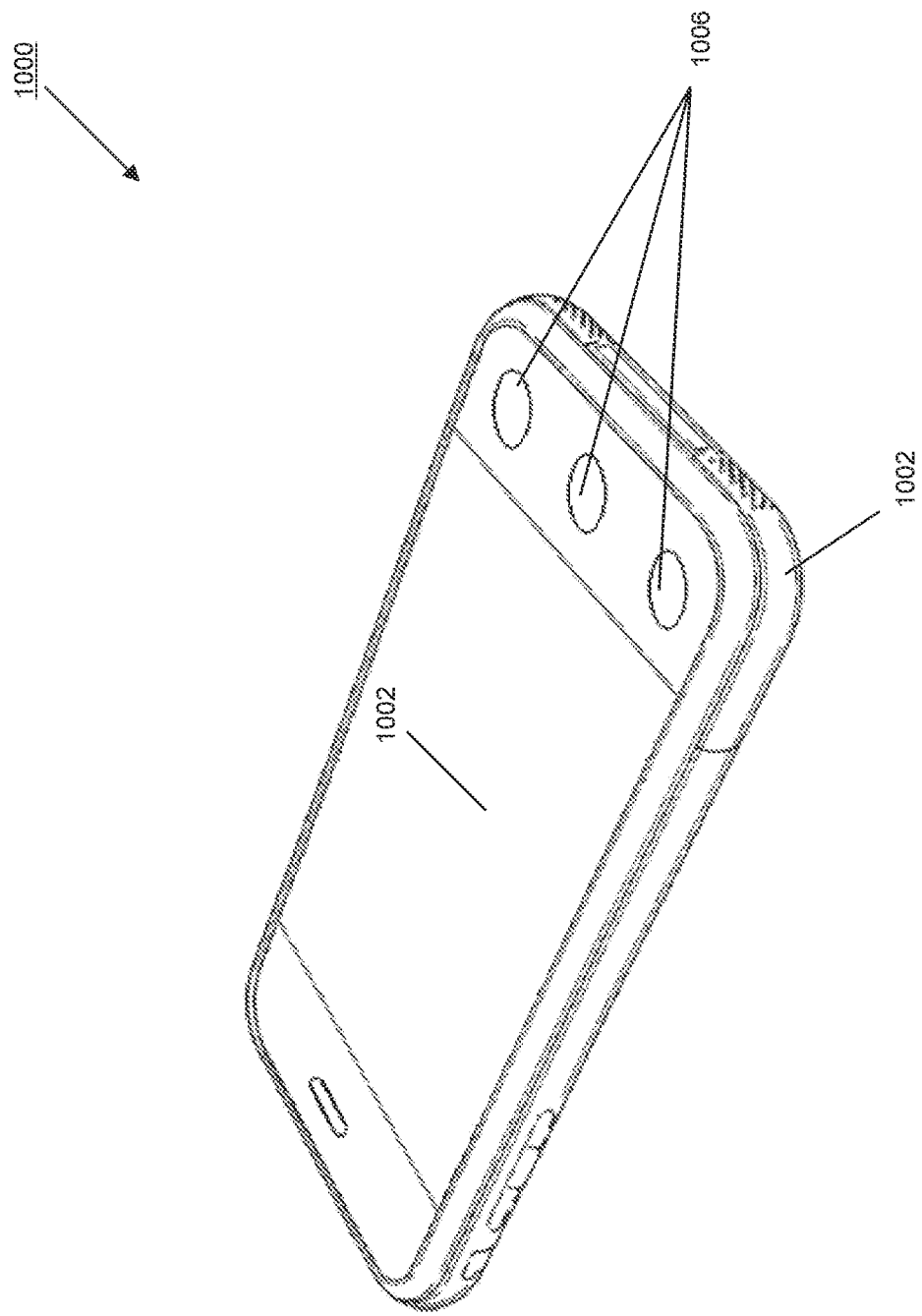
FIG. 10 is a perspective view illustrating an embodiment of a user device.

Referring now to FIG. 10, an embodiment of a transaction device 1000 is illustrated. The device 1000 may be any of the transaction devices discussed above. The device 1000 includes a chassis 1002 having a display 1004 and an input device including the display 1004 and a plurality of input buttons 1006. One of skill in the art will recognize that the device 1000 is a portable or mobile phone including a touch screen input device and a plurality of input buttons that allow the functionality discussed above with reference to the method 100. However, a variety of other portable/mobile devices and/or desktop devices may be used in the method 100 without departing from the scope of the present disclosure.

Figure 11:
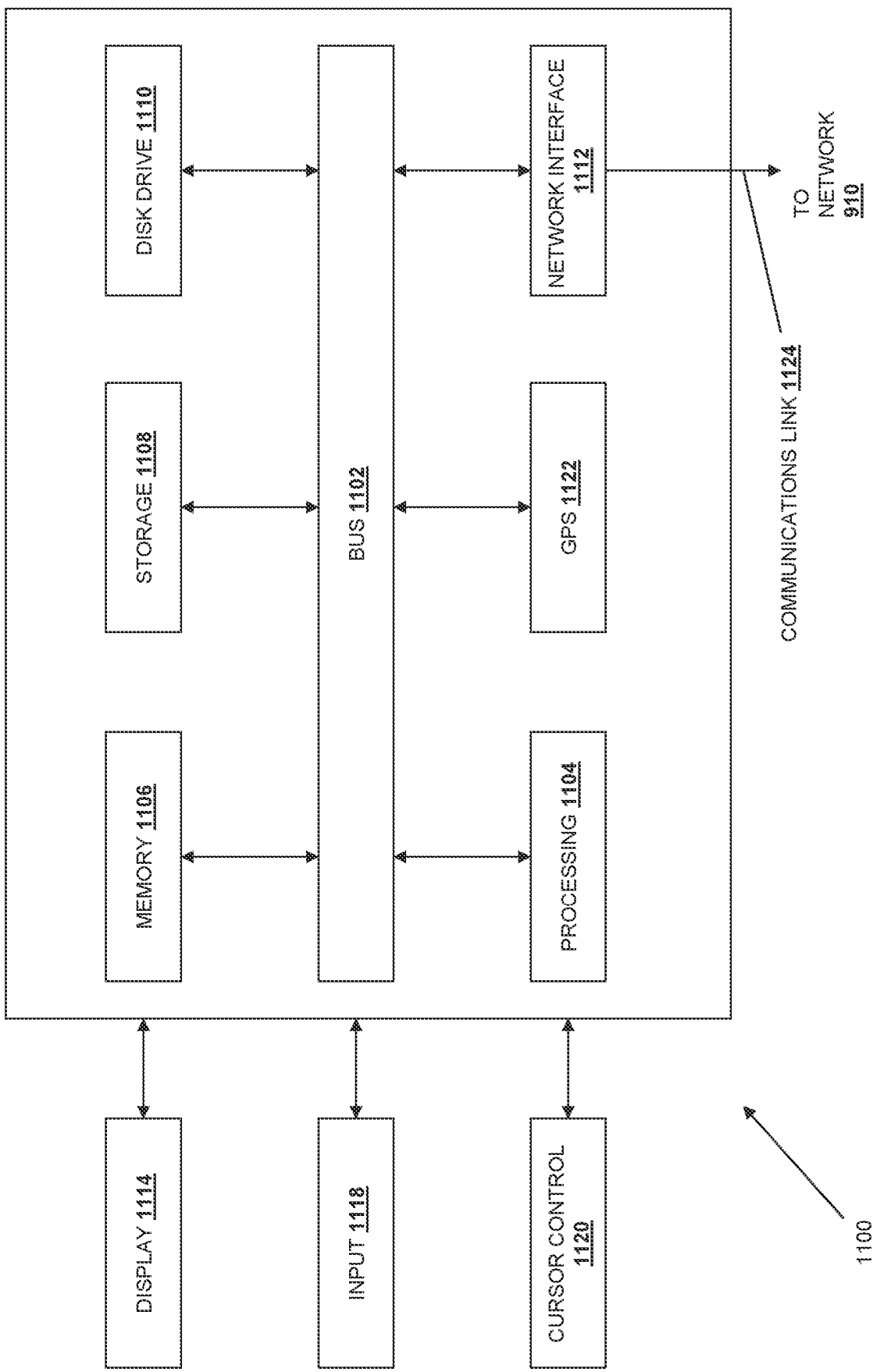
FIG. 11 is a schematic view illustrating an embodiment of a computer system.

Referring now to FIG. 11, an embodiment of a computer system 1100 suitable for implementing, for example, the transaction devices, miner devices, payment service provider device, and/or system provider devices, is illustrated. It should be appreciated that other devices utilized in the systems and methods discussed above may be implemented as the computer system 1100 in a manner as follows.

In accordance with various embodiments of the present disclosure, computer system 1100, such as a computer and/or a network server, includes a bus 1102 or other communication mechanism for communicating information, which interconnects subsystems and components, such as a processing component 1104 (e.g., processor, micro-controller, digital signal processor (DSP), etc.), a system memory component 1106 (e.g., RAM), a static storage component 1108 (e.g., ROM), a disk drive component 1110 (e.g., magnetic or optical), a network interface component 1112 (e.g., modem or Ethernet card), a display component 1114 (e.g., CRT or LCD), an input component 1118 (e.g., keyboard, keypad, or virtual keyboard), a cursor control component 1120 (e.g., mouse, pointer, or trackball), and/or a location determination component 1122 (e.g., a Global Positioning System (GPS) device as illustrated, a cell tower triangulation device, and/or a variety of other location determination devices known in the art). In one implementation, the disk drive component 1110 may comprise a database having one or more disk drive components.

In accordance with embodiments of the present disclosure, the computer system 1100 performs specific operations by the processing element 1104 (e.g., a processor) executing one or more sequences of instructions contained in the memory component 1106, such as described herein with respect to the payer devices, payee devices, user devices, payment service provider devices, and/or system provider devices. Such instructions may be read into the system memory component 1106 from another computer readable medium, such as the static storage component 1108 or the disk drive component 1110. In other embodiments, hardwired circuitry may be used in place of or in combination with software instructions to implement the present disclosure.

Logic may be encoded in a computer readable medium, which may refer to any medium that participates in providing instructions to the processor 1104 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 1110, volatile media includes dynamic memory, such as the system memory component 1106, and transmission media includes coaxial cables, copper wire, and fiber optics, including wires that comprise the bus 1102. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the present disclosure, execution of instruction sequences to practice the present disclosure may be performed by the computer system 1100. In various other embodiments of the present disclosure, a plurality of the computer systems 1100 coupled by a communication link 1124 to the network 910 (e.g., such as a LAN, WLAN, PTSN, and/or various other wired or wireless networks, including telecommunications, mobile, and cellular phone networks) may perform instruction sequences to practice the present disclosure in coordination with one another.

The computer system 1100 may transmit and receive messages, data, information and instructions, including one or more programs (i.e., application code) through the communication link 1124 and the network interface component 1112. The network interface component 1112 may include an antenna, either separate or integrated, to enable transmission and reception via the communication link 1124. Received program code may be executed by processor 1104 as received and/or stored in disk drive component 1110 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method for segregating transaction information using multiple blockchains, comprising:
   accessing, by a mining device, a communication from a first transaction device, the communication indicating a first digital transaction and including digital transaction information, the first digital transaction associated with a product or service, the digital transaction information comprising characteristics of the product or service;
   identifying, by the mining device based on the first digital transaction, a primary blockchain address for a primary blockchain that is associated with a first level of information for a plurality of products or services including the product or service;
   accessing, by the mining device on the primary blockchain via the primary blockchain address, previous digital transaction information for a previous digital transaction that is associated with the first digital transaction; and
   executing, by the mining device, a smart contract that stores at least a subset of the digital transaction information on a secondary blockchain, wherein:
   the previous digital transaction information includes a previous subset of digital transaction information corresponding to a second level of information associated with the product or service that is a different type of information as the first level of information, and the secondary blockchain stores respective second level information associated with a plurality of transactions stored via the primary blockchain, and wherein the executing the smart contract comprises:
   generating a digital asset that provides an access to the respective second level information, including the at least the subset of the digital transaction information, on the secondary blockchain, and
   encrypting the at least the subset of the digital transaction information using at least the digital asset, wherein the encrypting prevents revealing the at least the subset of the digital transaction information on the secondary blockchain in an absence of the digital asset being provided for the access.

2. The method of claim 1, wherein executing the smart contract further comprises:
   identifying a secondary blockchain address for the secondary blockchain that is associated with the second level of information for the product or service; and
   amending, using the secondary blockchain address, the previous subset of digital transaction information recorded on the secondary blockchain and associated with the product or service.

3. The method of claim 1, wherein executing the smart contract further comprises:
   creating a new secondary block at the secondary blockchain associated with the product or service; and
   identifying a secondary blockchain address for the new secondary block at the secondary blockchain, wherein the secondary blockchain address is associated with the previous subset of digital transaction information at the primary blockchain.

4. The method of claim 1, wherein executing the smart contract further comprises determining to store the at least the encrypted subset of the digital transaction information on the secondary blockchain instead of a tertiary blockchain based on a type of information of the digital transaction information, wherein the secondary blockchain stores a first type of information associated with transactions stored on the primary blockchain and the tertiary blockchain stores a second type of information associated with transactions stored on the primary blockchain.

5. The method of claim 1, wherein the primary blockchain is associated with a first access level, and the secondary blockchain is associated with a second access level.

6. The method of claim 1, wherein the smart contract is associated with the previous digital transaction information.

7. The method of claim 1, further comprising:
   storing, by the mining device in response to executing the smart contract, the digital asset that is associated with the secondary blockchain.

8. The method of claim 1, further comprising:
   tracking a chain of transactions associated with the product or service by storing additional information using a plurality of blockchains, including the secondary blockchain, that are linked with the primary blockchain via the primary blockchain address.

9. The method of claim 1, wherein the execution of the smart contract causes a third subset of the digital transaction information stored on a tertiary blockchain that is separate from the primary blockchain and the secondary blockchain.

10. The method of claim 1, wherein the digital transaction information includes non-encrypted digital transaction information, the previous digital transaction information includes encrypted digital transaction information, and the smart contract on the secondary blockchain is configured to provide for decryption of the previous digital transaction information.

11. A multi-blockchain transaction information tracking system, comprising:
    a non-transitory memory; and
    one or more hardware processors coupled to the non-transitory memory and configured to read instructions from the non-transitory memory to cause the multi-blockchain transaction information tracking system to:
    determine a first digital transaction based on communication from a first transaction device, the communication including digital transaction information indicating characteristics of a product or service that is associated with the first digital transaction;

access, using a primary blockchain address for a primary blockchain obtained based on the first digital transaction, a previous subset of digital transaction information for a previous digital transaction that is associated with the first digital transaction, the primary blockchain that is associated with a first level of information for a plurality of products or services including the product or service; and execute a smart contract associated with the previous subset of digital transaction information that causes storing at least a subset of the digital transaction information on a secondary blockchain, wherein:

the previous subset of digital transaction information corresponds to a second level of information associated with the product or service that is a different type of information as the first level of information, and the secondary blockchain stores respective second level information associated with a plurality of transactions stored via the primary blockchain, and wherein executing the smart contract comprises:

accessing a token that provides an access to the respective second level information, including the at least the subset of the digital transaction information, on the secondary blockchain, and encrypting the at least the subset of the digital transaction information based on at least the token, wherein the encrypting prevents revealing the at least the subset of the digital transaction information on the secondary blockchain in an absence of the token being provided for the access.

12. The multi-blockchain transaction information tracking system of claim 11, wherein executing the smart contract further comprises:

identifying a secondary blockchain address for the secondary blockchain that is associated with the second level of information for the product or service; and amending, using the secondary blockchain address, a second previous subset of digital transaction information stored via the secondary blockchain and associated with the product or service.

13. The multi-blockchain transaction information tracking system of claim 11, wherein executing the smart contract further comprises:

creating a new secondary block at the secondary blockchain associated with the product or service; and identifying a secondary blockchain address for the new secondary block at the secondary blockchain, wherein the secondary blockchain address is associated with the previous subset of digital transaction information at the primary blockchain.

14. The multi-blockchain transaction information tracking system of claim 11, wherein executing the smart contract further comprises determining to store the at least the encrypted subset of the digital transaction information on the secondary blockchain instead of a tertiary blockchain based on a type of information of the at least the subset of the digital transaction information, wherein the secondary blockchain stores a first type of information associated with transactions stored on the primary blockchain and the tertiary blockchain stores a second type of information associated with transactions stored on the primary blockchain.

15. The multi-blockchain transaction information tracking system of claim 11, wherein executing the instructions further causes the multi-blockchain transaction information tracking system to:

track a chain of transactions associated with the product or service by storing additional information using a plurality of blockchains, including the secondary blockchain, that are linked with the primary blockchain via the primary blockchain address.

16. A non-transitory machine-readable medium having stored thereon machine-readable instructions executable to cause a machine to perform operations comprising:

determining a first digital transaction based on communication from a first transaction device, the communication including digital transaction information indicating characteristics of a product or service that is associated with the first digital transaction;

accessing, using a primary blockchain address for a primary blockchain obtained based on the first digital transaction, a previous subset of digital transaction information for a previous digital transaction that is associated with the first digital transaction, the primary blockchain that is associated with a first level of information for a plurality of products or services including the product or service;

executing a smart contract associated with the previous subset of digital transaction information that causes storing at least a subset of the digital transaction information on a secondary blockchain, wherein:

the previous subset of digital transaction information corresponds to a second level of information associated with the product or service that is a different type of information as the first level of information, and the secondary blockchain stores respective second level information associated with a plurality of transactions stored using the primary blockchain, and wherein the executing the smart contract comprises:

accessing a token that provides an access to the respective second level information, including the at least the subset of the digital transaction information, on the secondary blockchain, and encrypting the at least the subset of the digital transaction information based on at least the token, wherein the encrypting prevents revealing the at least the subset of the digital transaction information on the secondary blockchain in an absence of the token being provided for the access.

17. The non-transitory machine-readable medium of claim 16, wherein executing the smart contract further comprises:

identifying a secondary blockchain address for the secondary blockchain that is associated with the second level of information for the product or service; and amending, using the secondary blockchain address, a second previous subset of digital transaction information stored using the secondary blockchain and associated with the product or service.

18. The non-transitory machine-readable medium of claim 16, wherein executing the smart contract further comprises:

creating a new secondary block at the secondary blockchain associated with the product or service; and identifying a secondary blockchain address for the new secondary block at the secondary blockchain, wherein the secondary blockchain address is associated with the previous subset of digital transaction information at the primary blockchain.

19. The non-transitory machine-readable medium of claim 16, wherein the operations further comprise tracking a chain of transactions associated with the product or service by storing additional information using a plurality of blockchains, including the secondary blockchain, that are linked with the primary blockchain via the primary blockchain address.

20. The non-transitory machine-readable medium of claim 16, wherein executing the smart contract further comprises determining to store the at least the encrypted subset of the digital transaction information on the secondary blockchain instead of a tertiary blockchain based on a type of information of the at least the subset of the digital transaction information, wherein the secondary blockchain stores a first type of information associated with transactions stored on the primary blockchain and the tertiary blockchain stores a second type of information associated with transactions stored on the primary blockchain.

* * * * *